United States Patent [19]

Parker

[11] Patent Number: 5,476,238
[45] Date of Patent: Dec. 19, 1995

[54] MULTIPLE STORES WEAPONS RAIL FOR USE WITH AN AIRCRAFT

[75] Inventor: William A. Parker, Camarillo, Calif.

[73] Assignee: The United States of America as represented by the Secretary of the Navy, Washington, D.C.

[21] Appl. No.: 281,803

[22] Filed: Jul. 22, 1994

[51] Int. Cl.$^6$ ..................................................... B64D 1/04
[52] U.S. Cl. ........................................ 244/137.4; 89/1.54
[58] Field of Search ............................ 244/137.1, 137.4, 244/118.1, 130; 89/1.54, 1.59, 1.802, 1.815, 1.816

[56] References Cited

U.S. PATENT DOCUMENTS

| | | | |
|---|---|---|---|
| 3,771,416 | 11/1973 | Ackerman et al. | |
| 4,008,645 | 2/1977 | Herbert | 244/137.4 |
| 4,395,003 | 7/1983 | Coutin | 244/137.4 |
| 4,679,751 | 7/1987 | Peterson | 244/137.4 |
| 4,692,764 | 10/1987 | Hardy et al. | 244/132.4 |
| 4,756,727 | 7/1988 | Ash et al. | 244/137.4 |
| 4,802,641 | 2/1989 | Hardy et al. | 244/137.4 |

FOREIGN PATENT DOCUMENTS

2543479  7/1977  Germany .......................... 244/118.2

*Primary Examiner*—Galen L. Barefoot
*Attorney, Agent, or Firm*—David S. Kalmbaugh; Melvin J. Sliwka

[57] ABSTRACT

A multiple stores weapons rail comprising a box beam structure spanning the underside of an aircraft's fuselage. The box beam structure has a forward structural member and a rear structural member which are flexibly coupled by a ball joint coupling at a predetermined location on the aircraft's fuselage. Extending from the box beam structure are first, second and third identically shaped elongated pylons with the first elongated pylon being located on the centerline of the box beam structure and the second and third elongated pylons being positioned adjacent the first elongated pylon at angle of about 24 degrees. Each of the three elongated pylons has front and rear portions flexibly coupled at the predetermined location on the aircraft's fuselage. The first elongated pylon has first, second and third openings, while the second and third elongated pylons each have first and second openings with each opening being adapted to accommodate a missile launcher or bomb rack.

8 Claims, 6 Drawing Sheets

MULTIPLE STORES WEAPONS RAIL FOR USE WITH AN AIRCRAFT

BACKGROUND OF THE INVENTION

1. Field of the Invention

The present invention relates generally to a weapons rail system and more particularly to an aircraft weapons rail adapted for loading and unloading weapons and maintaining the weapons in a delivery position on the aircraft.

2. Description of the Prior Art

In the field of military aircraft weapons delivery systems, one of the problems is the loading and unloading of weapons to and from aircraft delivery position. For example, the use of a common launcher for different kinds of missiles such as the Phoenix missile and the Sparrow missile have been found undesirable and difficult to use on the aircraft based on the added weight and complexity of these launchers. In addition, missile characteristics may suggest different positions on an aircraft for different kinds of missiles. Support arrangements for the common launchers require specialized equipment for each missile system which increases the aircraft internal volume, increases drag on the aircraft and generally degrades the performance of the aircraft.

Current and future military aircraft design requirements are placing an increased emphasis on reduced drag on the aircraft. Current and the next generation of aircraft will also require a reduction in the aircraft's signature effectively making the aircraft invisible to enemy radar. Critical factors to be considered by the designer in designing such next generation aircraft are the shape, weight, size and type of materials used in the aircraft weapons delivery system.

One such weapons delivery system of the prior art is the removable weapons rail of U.S. Pat. No. 3,771,416 to Ackerman et al which is adapted for bomb racks or missile launchers. Standard couplings are used to mount the weapons rail to the aircraft. The removable weapons rail includes bomb racks for attaching at least one bomb to the weapons rail. The removable weapons rail also has a built-in hoist system which is used for moving the weapons rail to or from a mounting system on the aircraft.

Another weapons delivery system of the prior art is the weapons dispensing system of U.S. Pat. No. 4,679,751 to Paul F. Paterson which includes a weapon positioning assembly for positioning the weapon in a stored position and a release position. The weapons positioning assembly comprises a weapon support rack. An actuator assembly is coupled by its first end to the aircraft and by its second end to the weapons positioning assembly. The actuator is adapted to move the positioning assembly from a stored position to a release position. There is also provided weapons release devices which are adapted to lock a weapon to the weapon support rack when the weapon position assembly is in the stored position and to release the weapon from the weapon support rack when the weapon position assembly is in the release position.

A third weapons delivery system of the prior art is the aircraft missile launcher of U.S. Pat. No. 4,412,475 which comprises a jettisonable missile launcher having support lugs extending upwardly through a separate hardback structure to latch into standard release hooks in an aircraft pylon. The hardback is attached to the pylon and contains the electronic gear for the missile system. When the launcher pad is jettisoned, it drops from the release hooks, but the electronic gear remains with the aircraft in the hardback.

While each of these prior art weapons delivery systems functions adequately for its intended purpose which is that of providing a means whereby a missile or other weapon may be jettisoned from an aircraft these prior art weapons delivery systems are not aerodynamically compatible with state of art fighter and other military aircraft. Further, these prior art weapons systems provide a radar signature which is easily detected by enemy radar thus exposing the aircraft to extreme danger from the enemy's weapons systems such as anti-aircraft guns, guided missiles and the like.

Accordingly, it is an object of the present invention to provide a universal weapons mounting system adaptable for a variety of aircraft weapons.

Another object of the present invention is to provide a reliable and economical weapons mounting system.

A further object of the present invention is to provide a weapons mounting system which is aerodynamically compatible with state of the art fighter and other military aircraft.

Other objects, advantages and novel features of the present invention will become more apparent from the detailed description of the invention when considered in conjunction with the accompanying drawings.

SUMMARY OF THE INVENTION

The objects of the present invention are satisfied by a multiple stores weapons rail adapted for use with the F-14 and other fighter aircraft which comprises a box beam structure spanning a substantial portion of the underside of the aircraft's fuselage. The box beam structure has a forward structural member and a rear structural member which are joined by a ball joint coupling at a predetermined location on the aircraft's fuselage. Extending from the box beam structure are first, second and third substantially identical shaped elongated pylons with the first elongated pylon being located on the centerline of the box beam structure and the second and third elongated pylons positioned adjacent the first elongated pylon at angle of about 24 degrees. Each of the three elongated pylons has front and rear structural members and is flexibly coupled at the predetermined location on the aircraft's fuselage.

The first elongated pylon has first, second and third openings, while the second and third elongated pylons each have first and second openings with each opening being adapted to accommodate a missile launcher or bomb rack.

Attached to the front end of the box beam structure is a parabolic curved pickle fork structure/faring to enhance airflow on the underside of the aircraft which reduces drag on the aircraft. The front end of each of the three elongated pylons is also configured to have a parabolic shape thereby enhancing the aircraft's aerodynamic performance.

DETAILED DESCRIPTION OF THE PREFERRED EMBODIMENT

Figure 1:
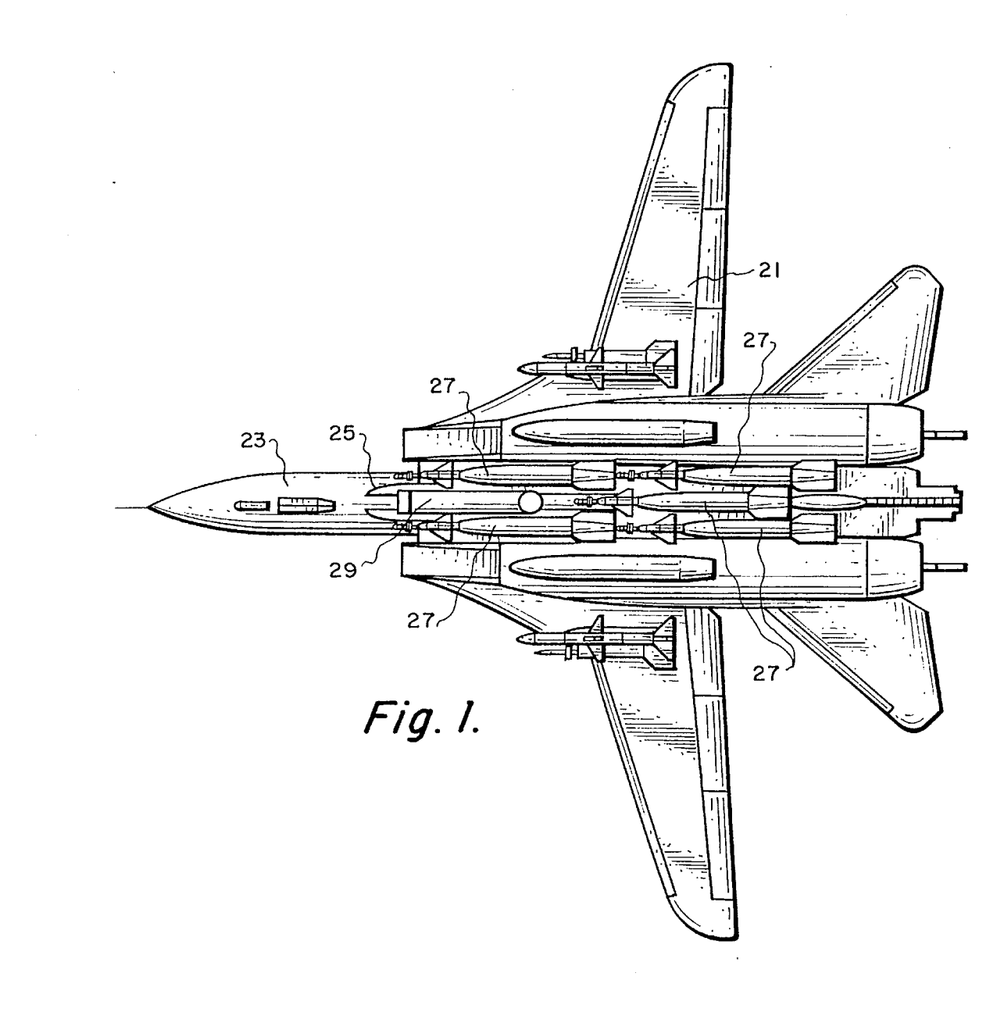
FIG. 1 illustrates the multiple stores weapons rail of the present invention mounted on the underside of an aircraft.
Figure 2:
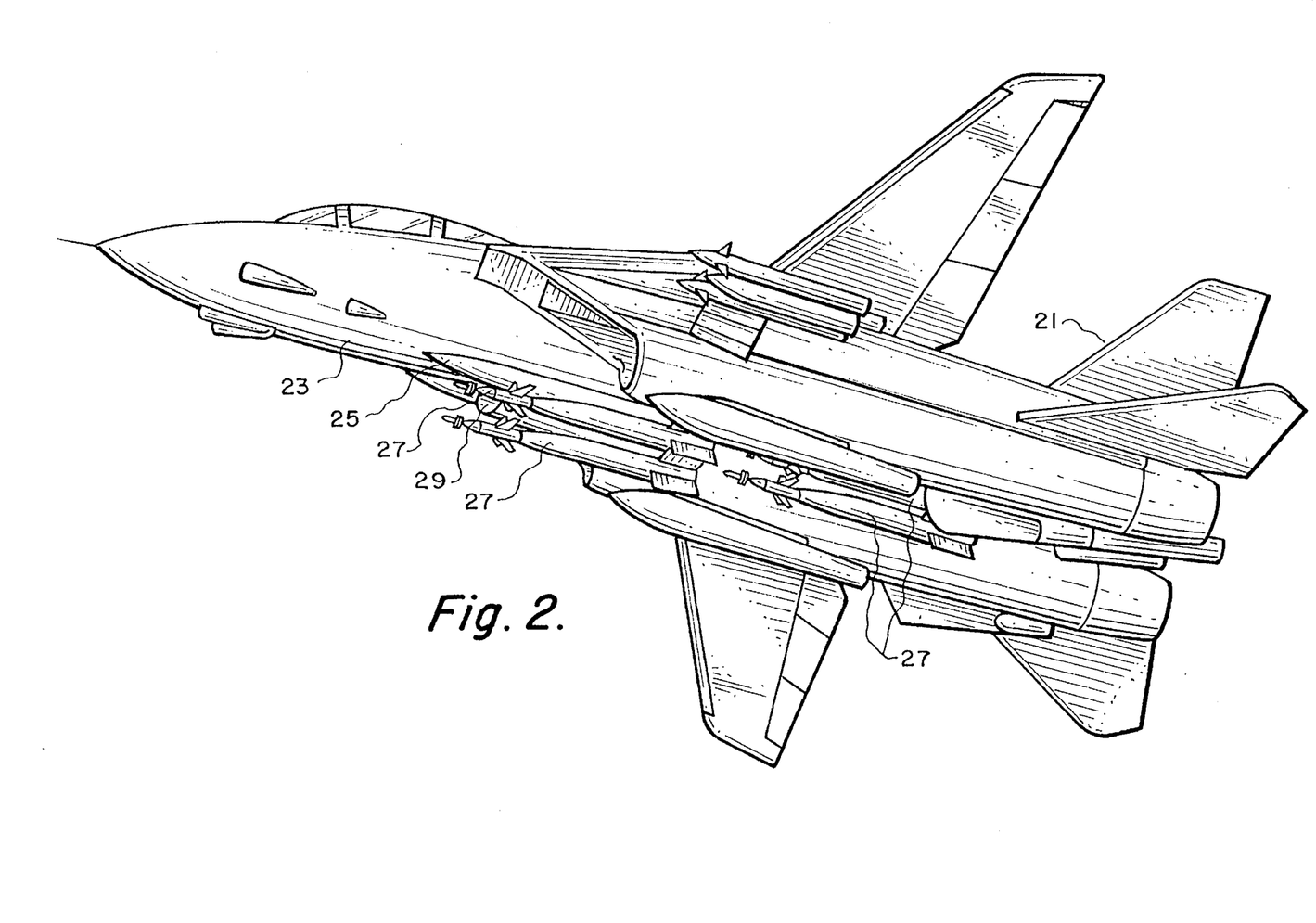
FIG. 2 illustrates a perspective view of the aircraft having the multiple stores weapons rail mounted on its underside.

Referring first to FIGS. 1 and 2, there is shown a fighter aircraft 21 which has mounted to the underside of its fuselage 23 a multiple stores weapons rail 25 constituting the preferred embodiment of the present invention. Multiple stores weapons rail 25 is adapted to accommodate a plurality of missile launchers and their associated missiles 27, such as the phoenix missile, which are to be jettisoned from the aircraft 21. Multiple stores weapons rail 25 is also adapted to accommodate aircraft auxiliary equipment such as the forward looking infrared sensor 29 mounted towards the front of aircraft 21 on its underside. It should be noted that multiple stores weapons rail 25 is adapted for use with a variety of fighter aircraft 21 such as, for example, the F-14 Tomcat or similar fighter/attack aircraft.

Figure 3:
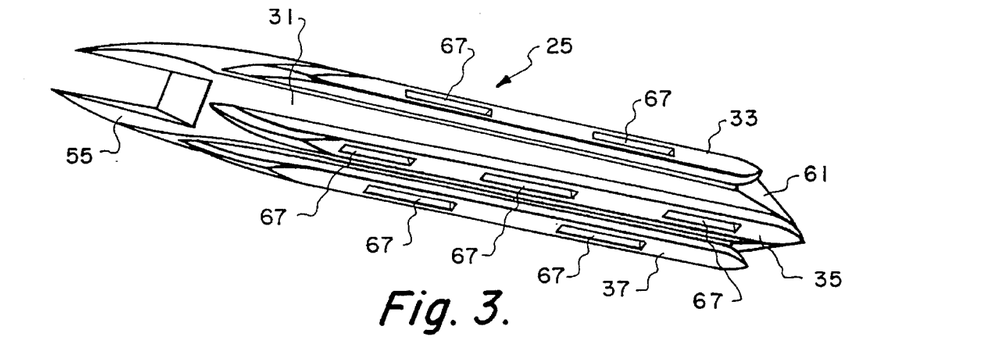
FIG. 3 is a simplified perspective view of the multiple stores weapons rail constituting the present invention.
Figure 4:
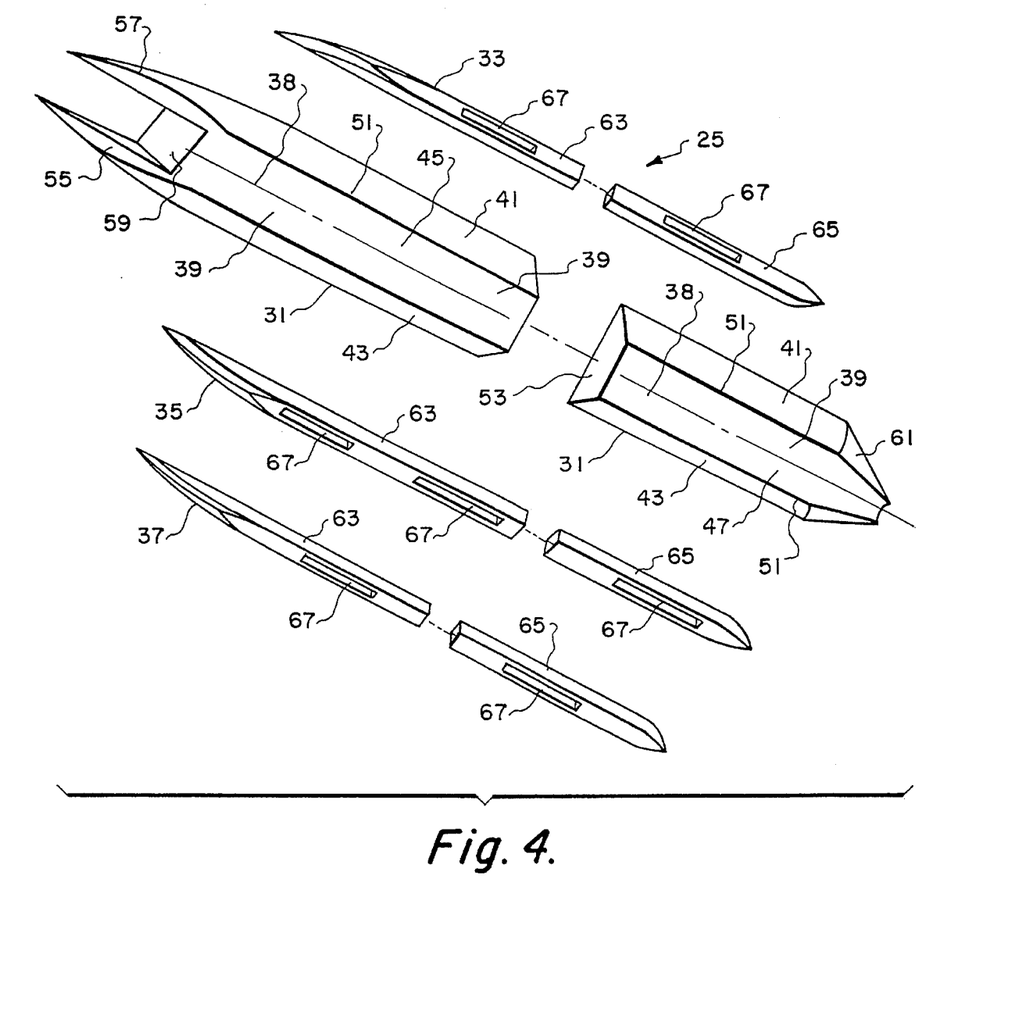
FIG. 4 is an exploded perspective view of the multiple stores weapons rail showing the overall arrangement of the present invention.

Referring to FIGS. 3 and 4, multiple stores weapons rail 25 comprises an elongated box beam structure 31 spanning a substantial portion of the underside of the fuselage 23 of aircraft 21. Box beam structure 31, in turn, includes three substantially identical shaped elongated pylons 33, 35, and 37 with pylon 35 being attached at the centerline 38 of box beam structure 31 on its bottom 39. Pylons 33 and 37 are respectively attached to opposite sides 41 and 43 of box beam structure 31 and extend from box beam structure 31 at an angle of about 24 degrees from a vertical plane when the bottom side 39 of structure 31 lies in a horizontal plane.

It should be noted that pylons 33 and 37 are configured to extend from box beam structure 31 at a 24 degree angle to allow missiles 27 to clear fighter aircraft 21 whenever the missiles 27 are jettisoned from fighter aircraft 21 as is best illustrated in FIG. 2. It should also be noted that pylons 33, 35 and 37 are attached to box beam structure 31 by bolts, not shown, thus allowing for the removal of pylons 33, 35 and 37 from box beam structure 31

Box beam structure 31 has a forward structural member 45 and a rear structural member 47 which are joined by a ball joint coupling 49 (illustrated in FIG. 5) at a predetermined location on the underside of fuselage 23. The forward structural member 45 and rear structural member 47 are hollow with each member 45 and 47 being fabricated from titanium plate. The joints 51 where, for example, side plate 41 is affixed to bottom plate 39 and side plate 43 is affixed to bottom plate 39 are electron beam welded. Members 45 and 47 respectively have titanium end plates 52 and 53 attached to the end of the member. Members 45 and 47 are coupled to the other member by a ball joint coupling 49, FIG. 5.

There is positioned at the front end of box beam structure 31 a forward faring 55 which is attached to member 45 by bolts, not shown. Forward faring 55 is configured in the shape of a pickle fork having parabolic edges 57 and a ramped rectangular shaped center plate 59 which is sloped at an angle of about 27 degrees from the bottom of aircraft fuselage 23. There is also a aft/rear faring 61 positioned at the rear of box beam structure 31 which is attached to structure 31 by bolts, not shown. Both forward faring 55 and rear faring 61 are aerodynamically shaped to reduce drag on fighter aircraft 21 when fighter aircraft 21 is in flight.

As is best illustrated by FIG. 4, each pylon 33, 35 and 37 has a forward weapons rail segment 63 and a rear weapons rail segment 65. Forward weapons rail segment 63 of centrally located pylon 35 has two openings 67, while rear weapons rail segment 65 of pylon 35 has one opening 67. Similarly, forward weapons rail segment 63 of side pylons 33 and 37 each have one opening 67, while rear weapons rail segment 65 of pylons 33 and 37 each have one opening 67. The openings of pylons 33, 35 and 37 are each adapted to receive bomb racks, such as the MAU-12D/A bomb rack or missile launchers for missiles 27, such as the Phoenix missile launcher. It should also be noted that the two openings 67 of forward weapons rail segment 63 of pylon 35 are adapted to receive the mounting hardware, not illustrated, for forward looking infrared sensor 29, FIG. 1.

It should be noted that forward weapons rail segment 63 and a rear weapons rail segment 65 of pylons 33, 35 and 37 may be fabricated from titanium plate.

Figure 5:
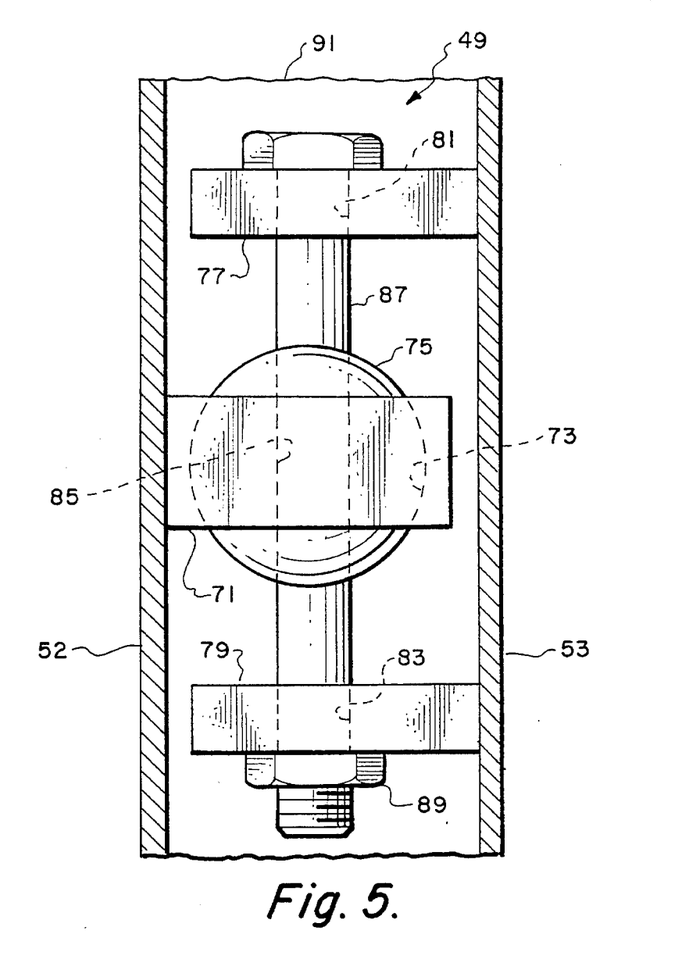
FIG. 5 illustrates a bottom view of the ball joint coupling which joins the forward structural member of the box beam structure to the rear structural member of the box beam structure of the multiple stores weapons rail of FIG. 3.

Referring to FIGS. 3, 4 and 5, there is shown ball joint coupling 49 which joins the forward structural member 45 to the rear structural member 47 of box beam structure 31. Ball joint coupling 49 comprises a centrally locate support member 71 which is attached to end plate 52 of forward structural member 45. Centrally located support member 71 has a spherical shaped inner surface/race 73 which allows support member to seat a ball joint 75 thereby providing for rotational movement of ball joint 75 within support member 71. There is positioned on each of side of and parallel to centrally located support member 71 a pair of side support members 77 and 79. Side support members 77 and 79 are attached to end plate 53 of rear structural member 47. Support members 77 and 79 respectively have apertures 81 and 83 which are aligned with an aperture 85 in ball joint 75. Aligned apertures 81, 83 and 85 are adapted to receive a bolt 87 which passes through apertures 81, 85 and 83 and is secured to support members 77 and 79 by a nut 89 threadably connected to bolt 87. Ball joint coupling 49 allows for angular and rotational movement of forward structural member 45 with respect to the rear structural member 47 of box beam structure 31 which is necessitated by stresses exerted on the fuselage 23 of fighter aircraft 21 during flight. Since there is rotational and angular movement of forward structural member 45 with respect to the rear structural member 47 of box beam structure 31, a thin sheet of flexible material 91, such a rubberized compound or canvass may be positioned around the outer surface of box beam structure 31 between members 45 and 47 as is best illustrated in FIG. 5.

Figure 6:
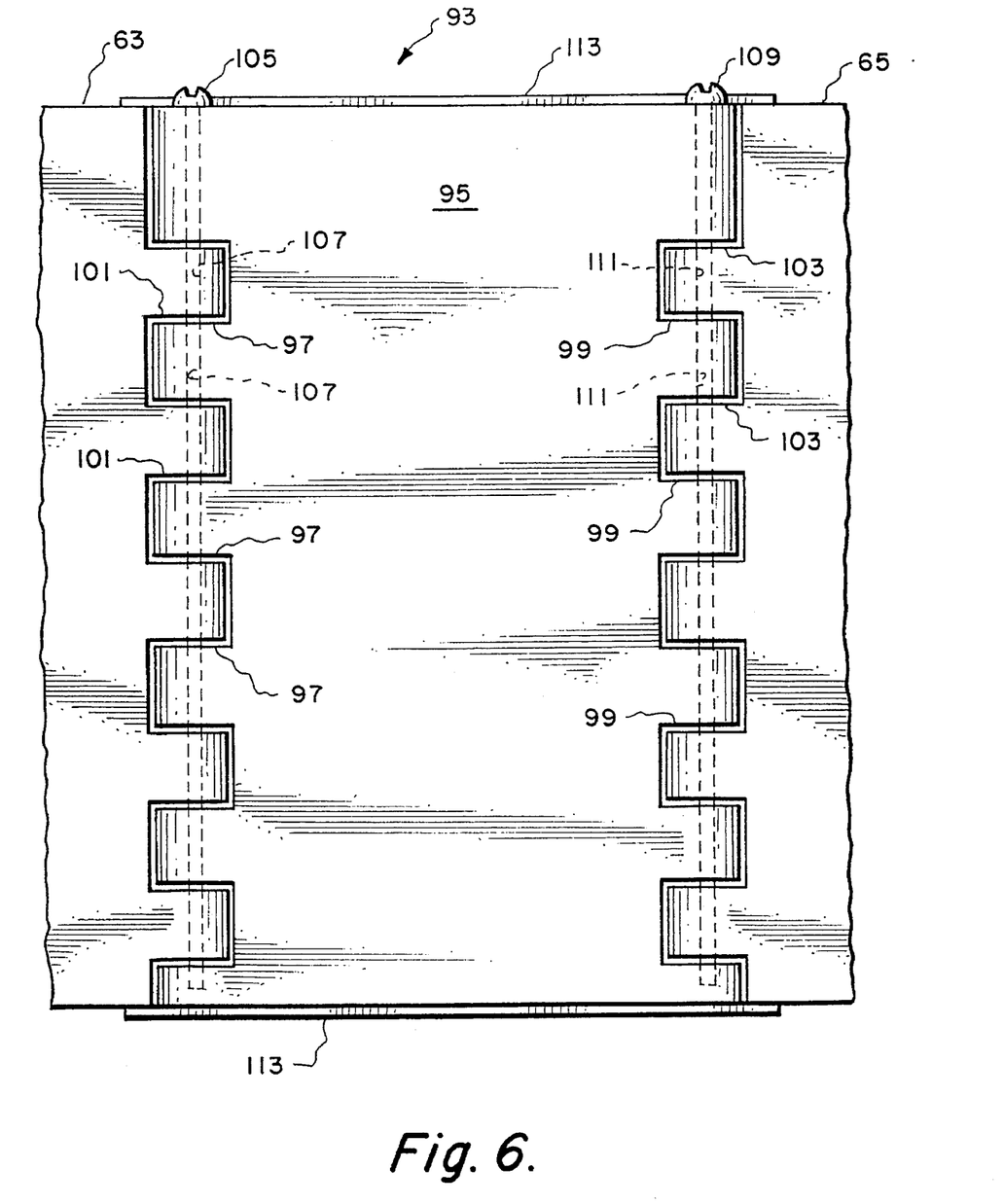
FIG. 6 illustrates a side view of the pylon flexure coupling which joins the forward weapons rail segment to the rear weapons rail segment of each pylon of the present invention.

Referring to FIG. 6 there is shown a pylon flexure coupling 93 which is used to flexibly couple forward weapons rail segment 63 to rear weapons rail segment 65 of each pylon 33, 35 and 37 of multiple stores weapons rail 25. Pylon flexure coupling includes a rectangular plate 95 having on its one side a plurality of internal teeth 97 and on its opposite side a plurality of internal teeth 99. The internal teeth 97 of rectangular plate 95 rotatably engage a plurality of external teeth 101 of forward weapons rail segment 63. In a like manner, the internal teeth 99 of plate 95 rotatably engage a plurality of external teeth 103 of rear weapons rail segment 65.

An elongated pin 105, which is press fit into the top and bottom of plate 95, passes through an aperture 107 within each internal tooth 97 and each external tooth 101, to secure plate 95 to forward weapons rail segment 63. Similarly, an elongated pin 109, which is press fit into the top and bottom of plate 95, passes through an aperture 111 within each internal tooth 99 and each external tooth 103 to secure plate 95 to rear weapons rail segment 65.

At this time it should be noted that each pylon 33, 35, and 37 of multiple stores weapons rail 25 has a pair of pylon flexure couplings 93 with one of the couplings being located on each side of the pylon. Utilizing a pair of pylon flexure couplings allows for lateral movement of the forward weapons rail segment 63 with respect to the rear weapons rail segment 65. This lateral movement of segment 63 with respect to segment 65 is necessitated by stress and strain placed on aircraft 21 and weapons rail 25 during flight.

A flexible material 113, such as canvas or rubber, is placed on the top and bottom of each pylon extending from the rear end of forward weapons rail segment 63 across the top and bottom of plate 95 of each pylon flexure coupling 93 to the forward end of rear weapons rail segment 65 as is best illustrated by FIG. 6. Flexible material 113 may be secured to the pylon by rivets, not illustrated.

Referring to FIGS. 1, 3, 4, 7a and 7b, there is shown one of the eight ball joint couplings 115 used to secure box beam structure 31 to the underside of the fuselage 23 of aircraft 25. Multiple stores weapons rail 21 includes eight ball joint couplings 115 with one coupling 115 being positioned near each corner of forward structural member 45 and one coupling being positioned near each corner of rear structural member 47. Each ball joint coupling 115 comprises a clevis 117 having a U shaped yoke 119 and a stem 121.

Figure 7A:
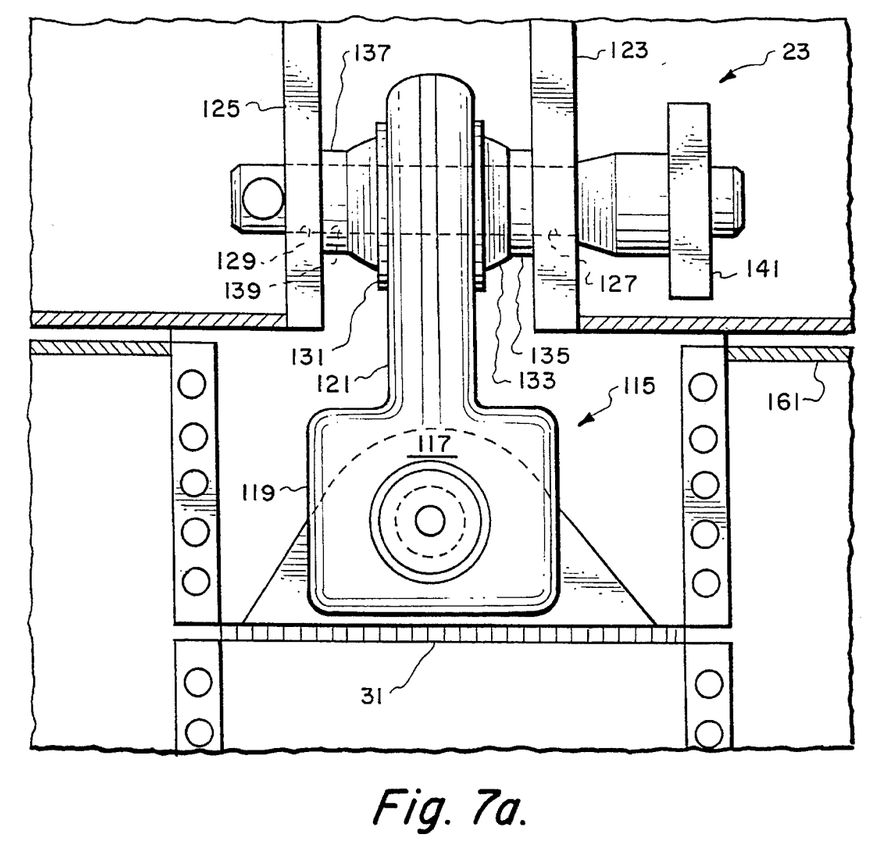
FIGS. 7a and 7b are a sectional view of a ball joint coupling used to secure the multiple stores weapons rail of FIG. 3 to an aircraft.

Referring to FIGS. 1, 3 and 7a, aircraft fuselage 23 has a pair of support members 123 and 125 for engaging each of the eight ball joint couplings 115 of multiple stores weapons rail 25. Support member 123 has an aperture 127 which is aligned with an aperture 129 within support member 25. Stem 121 of clevis 117 has a spherical shaped inner surface/ race 131 which allows stem 121 to seat a ball joint 33 thereby providing for rotational movement of ball joint 33 within stem 121 of clevis 117. Ball joint 133 has integral flanges 135 and 137 with flange 135 being mounted flush against the inner surface of support member 123 and flange 137 being mounted flush against the inner surface of support member 125. Ball joint 133 also has an aperture 139 which is in alignment with apertures 127 and 129. Aligned apertures 127, 129 and 139 are adapted to receive a quick release pin 141. Quick release pin 141 is used to secure ball joint coupling 115 to support members 123 and 125 of fuselage 23 and also allows for the disengagement of ball joint coupling 115 from fuselage 23 by removing quick release pin 141 from the aperture 139 within ball joint 133.

Figure 7B:
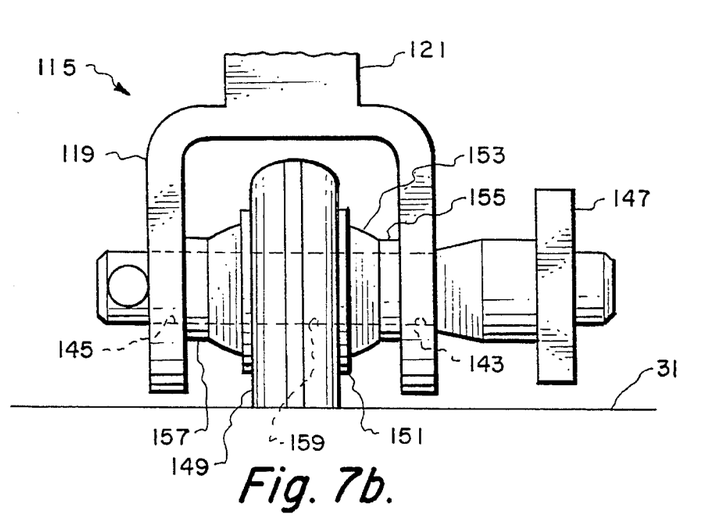

As illustrated by FIG. 1, 3 and 7b, there is shown the U shaped yoke 119 of clevis 117 for one of the eight identical ball joint couplings used in the preferred embodiment of the present invention. U shaped yoke 119 has a pair of aligned apertures 143 and 145 adapted to receive a quick release pin 147. A mounting bracket 149 attached to box beam structure 31 has a spherical shaped inner surface/race 151 which allows mounting bracket 149 to seat a ball joint 153 thereby providing for rotational movement of ball joint 153 within mounting bracket 149. Ball joint 153 has integral flanges 155 and 157 with integral flange 155 and 157 being mounted flush against the inner surface of U shaped yoke 119. Ball joint 153 also has an aperture 159 which is in alignment with apertures 143 and 145 of U shaped yoke 119 and is also adapted to receive quick release pin 147. Quick release pin 147 is used to secure ball joint coupling 115 to forward structural member 45 and a rear structural member 47 of box beam structure 31 and also allows for the disengagement of ball joint coupling 115 from forward structural member 45 and a rear structural member 47 of box beam structure 31 by removing quick release pin 147 from the aperture 159 within ball joint 153.

Figure 8:
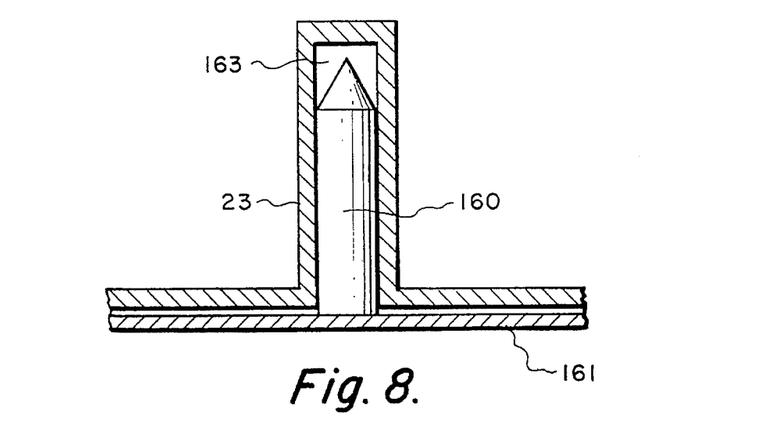
FIG. 8 is a sectional view of a bayonet fitting used with the invention of FIG. 3.

Referring to FIGS. 1, 3, 4 and 8, there is shown one of the eight bayonet fittings 160, mounted on the upper surface 161 of box beam structure 31. Each bayonet fitting 160 is positioned adjacent one of the eight ball joint couplings 115 of multiple stores weapons rail 25. Thus, forward structural member 45 has four bayonet fittings 160 and rear structural member 47 has four bayonet fittings 160. Each bayonet fitting 160 is adapted to fit within a rectangular shaped slot 163 within the underside of the aircraft's fuselage 23. As is best illustrated by FIG. 8 rectangular shaped slot 163 is about the same dimensions as bayonet fitting 160 from which prevents bayonet fitting 160 moving freely within rectangular shaped slot 163. The combination of bayonet fittings 160 and ball joint couplings 115, FIG. 7a allow for forward and aft movement as well as lateral movement of box beam structure 31 with respect to the aircraft's fuselage 23 to accommodate the twisting and bending of the aircraft's fuselage 23 during flight.

Obviously many modifications and variations of the present invention are possible in light of the above teachings. It is therefore to be understood that within the scope of the appended claims, the invention may be practiced otherwise than as specifically described.

What is claimed is:

1. A multiple stores weapons rail attached to an underside of a fuselage of an aircraft, said multiple stores weapons rail comprising:

an elongated box beam structure mounted on the underside of the fuselage of said aircraft, said elongated box beam structure having a forward structural member and a rear structural member;

ball joint coupling means for coupling said forward structural member to said rear structural member, said ball joint coupling means allowing for rotational and angular movement of said forward structural member with respect to said rear structural member; and first, second and third substantially identical shaped elongated pylons attached to said elongated box beam structure respectively on a bottom, one side and an opposite side of said elongated box beam structure, said first elongated pylon being located on a centerline of said elongated box beam structure, said second and third elongated pylons extending from said elongated box beam structure at an angle of about twenty four degrees;

said first elongated pylon having at least three openings, said second and third elongated pylons having at least two openings, each of said openings of said first, second and third pylons being adapted to receive a missile launcher for a missile.

said ball joint coupling means comprising:

a centrally located support member attached to an end plate of said forward structural member, said centrally located support member having a spherical shaped inner surface, the spherical shaped inner surface of said centrally located support member being adapted to seat a ball joint thereby providing for rotational movement of said ball joint within said centrally located support member, said ball joint having an aperture;

first and second side support members positioned on each side of and parallel to said centrally located support member, said first and second side support members being attached to an end plate of said rear structural member;

each of said first and second side support members having an aperture aligned with the aperture of said ball joint;

the apertures of said first and second side support members and the aperture of said centrally located support member receiving a bolt, said bolt being secured to said first and second side support members and said centrally located support member by a nut threadably connected to said bolt.

2. The multiple stores weapons rail of claim 1 further comprising a forward faring attached to a front end of said box beam structure, said forward faring being configured as a pickle fork.

3. The multiple stores weapons rail of claim 1 comprising an aft faring attached to a rear end of said box beam structure.

4. A multiple stores weapons rail attached to an underside of a fuselage of an aircraft, said multiple stores weapons rail comprising:

an elongated box beam structure mounted on the underside of the fuselage of said aircraft, said elongated box beam structure having a forward structural member and a rear structural member;

ball joint coupling means for coupling said forward structural member to said rear structural member, said ball joint coupling means allowing for rotational and angular movement of said forward structural member with respect to said rear structural member;

first, second and third substantially identical shaped elongated pylons attached to said elongated box beam structure respectively on a bottom, one side and an opposite side of said elongated box beam structure, said first elongated pylon being located on a centerline of said elongated box beam structure, said second and third elongated pylons extending from said elongated box beam structure at an angle of about twenty four degrees;

said first elongated pylon having at least three openings, said second and third elongated pylons having at least two openings, each of said openings of said first, second and third pylons being adapted to receive a missile launcher for a missile;

each of said first, second and third elongated pylons having a forward weapons rail segment and a rear weapons rail segment; and first, second and third pylon flexure coupling means for flexibly coupling the forward weapons rail segment to the rear weapons rail segment respectively of each of said first, second and third elongated pylons.

5. The multiple stores weapons rail of claim 4 wherein said ball joint coupling means comprises:

a centrally located support member attached to an end plate of said forward structural member, said centrally located support member having a spherical shaped inner surface, the spherical shaped inner surface of said centrally located support member being adapted to seat a ball joint thereby providing for rotational movement of said ball joint within said centrally located support member, said ball joint having an aperture;

first and second side support members positioned on each side of and parallel to said centrally located support member, said first and second side support members being attached to an end plate of said rear structural member; and each of said first and second side support members having an aperture aligned with the aperture of said ball joint;

the apertures of said first and second side support members and the aperture of said centrally located support member receiving a bolt, said bolt being secured to said first and second side support members and said centrally located support member by a nut threadably connected to said bolt.

6. The multiple stores weapons rail of claim 4 further comprising a forward faring attached to a front end of said box beam structure, said forward faring being configured as a pickle fork.

7. The multiple stores weapons rail of claim 4 comprising an aft faring attached to a rear end of said box beam structure.

8. The multiple stores weapons rail of claim 4 wherein said first, second and third pylon flexure coupling means each comprise:

a pair of pylon flexure couplings, said pair of pylon flexure couplings flexibly coupling said forward weapons rail segment to said rear weapons rail segment;

each of said pylon flexure couplings including:

a rectangular plate having on one side a first plurality of internal teeth and on an opposite side a second plurality of internal teeth;

said first plurality of internal teeth being coupled to a first plurality of external teeth of said forward weapons rail segment in rotatable engagement with said first plurality of external teeth of said forward weapons rail segment; and said second plurality of internal teeth being coupled to a second plurality of external teeth of said rear weapons rail segment in rotatable engagement with said second plurality of external teeth of said rear weapons rail segment.

* * * * *